US010033646B2

(12) United States Patent
He et al.

(10) Patent No.: US 10,033,646 B2
(45) Date of Patent: Jul. 24, 2018

(54) RESILIENT ACTIVE-ACTIVE DATA LINK LAYER GATEWAY CLUSTER

(71) Applicant: International Business Machines Corporation, Armonk, NY (US)

(72) Inventors: Jing He, WuXi (CN); Gang Tang, Nanjing (CN); Ming Shuang Xian, WuXi (CN); Xing Yu Zhu, WuXi (CN)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 15/152,605

(22) Filed: May 12, 2016

(65) Prior Publication Data

US 2017/0331742 A1 Nov. 16, 2017

(51) Int. Cl.
*H04L 12/28* (2006.01)
*H04L 12/803* (2013.01)
*H04L 12/46* (2006.01)
*H04L 12/715* (2013.01)
*H04L 12/741* (2013.01)
*H04L 12/755* (2013.01)

(52) U.S. Cl.
CPC ........ *H04L 47/125* (2013.01); *H04L 12/4641* (2013.01); *H04L 12/4679* (2013.01); *H04L 45/021* (2013.01); *H04L 45/46* (2013.01); *H04L 45/745* (2013.01)

(58) Field of Classification Search
CPC . H04L 47/125; H04L 12/4679; H04L 45/021; H04L 45/46; H04L 12/4641; H04L 45/745
See application file for complete search history.

(56) References Cited

U.S. PATENT DOCUMENTS

| 7,386,628 | B1* | 6/2008 | Hansell | H04L 45/745 |
| | | | | 709/236 |
| 8,125,991 | B1* | 2/2012 | Schlansker | H04L 45/7457 |
| | | | | 370/392 |
| 8,908,691 | B2 | 12/2014 | Biswas et al. | |
| 8,923,155 | B2 | 12/2014 | Qu et al. | |
| 9,008,085 | B2 | 4/2015 | Kamble et al. | |
| 9,098,085 | B2* | 8/2015 | Aznavorian | G05D 1/021 |
| 9,170,951 | B1* | 10/2015 | He | G06F 12/0844 |
| 9,331,958 | B2* | 5/2016 | Lie | H04L 49/25 |
| 9,736,070 | B2* | 8/2017 | Biswas | H04L 45/7453 |
| 2013/0179876 | A1* | 7/2013 | Aliminati | H04L 41/0893 |
| | | | | 717/177 |

(Continued)

OTHER PUBLICATIONS

Xia et al., "Layer 2 Gateway (L2GW)", DataTracker, Last Updated Apr. 30, 2015, Printed Jan. 7, 2016, 3 pages, <https://datatracker.ietf.org/doc/draft-xia-nvo3-l2gw/>.

(Continued)

*Primary Examiner* — Robert Wilson
(74) *Attorney, Agent, or Firm* — Edward J. Wixted, III (57) ABSTRACT

In an approach for achieving resilience and load balancing control over layer 2 gateways in a cluster, a processor forms a cluster, wherein the cluster includes one or more layer 2 gateways. A processor registers endpoints for a tenant system attached to a virtual network through a bridge network to add to an endpoint database used to associate a destination MAC address with the cluster. A processor distributes flow of data.

17 Claims, 6 Drawing Sheets

(56) References Cited

U.S. PATENT DOCUMENTS

| | | | |
|---|---|---|---|
| 2014/0050091 A1* | 2/2014 | Biswas | H04L 45/64 370/235 |
| 2014/0092907 A1 | 4/2014 | Sridhar et al. | |
| 2015/0026102 A1* | 1/2015 | Anantharam | G06N 99/005 706/12 |
| 2016/0006654 A1* | 1/2016 | Fernando | H04L 45/74 370/392 |
| 2016/0142295 A1* | 5/2016 | Parsa | H04L 45/46 370/392 |
| 2016/0352579 A1* | 12/2016 | He | H04L 41/12 |

OTHER PUBLICATIONS

"Network Virtualization Overlays (nvo3)", DataTracker, Version 6.11.0.p1, Dec. 5, 2015, Printed Jan. 7, 2016, 3 pages, <https://datatracker.ietf.org/wg/nvo3/documents/>.

Configuring the VXLAN overlay gateway for Layer 2 extension, Provided in Search Report Oct. 30, 2015, 2 pages, <brocade.com/content/html/en/configuration-guidelines/nos-601a-12guide/GUID-7CA580A5-89C6-4D94-AE19-B2812384D0F2.html>.

Mell et al., "The NIST Definition of Cloud Computing", NIST, Special Publication 800-145, Sep. 2011, 7 pages.

\* cited by examiner

RESILIENT ACTIVE-ACTIVE DATA LINK LAYER GATEWAY CLUSTER

BACKGROUND

The present invention relates generally to the field of overlay networks, and more particularly to achieving resilience and load balancing control over data link layer (layer 2) gateways in a cluster.

An overlay network is a computer network that is built on top of another network. Nodes in the overlay network can be thought of as being connected by virtual or logical links, each of which corresponds to a path, perhaps through many physical links, in an underlying network. For example, distributed systems, such as peer-to-peer networks and client-server applications are overlay networks because the nodes run on top of the Internet. The Internet was originally built on an overlay upon the telephone network, while today through the advent of VoIP, the telephone network is increasingly turning into an overlay network built on top of the Internet.

SUMMARY

Aspects of an embodiment of the present invention disclose a method, computer program product, and computing system for achieving resilience and load balancing control over layer 2 gateways in a cluster. A processor forms a cluster, wherein the cluster includes one or more layer 2 gateways. A processor registers endpoints for a tenant system attached to a virtual network through a bridge network to add to an endpoint database used to associate a destination MAC address with the cluster. A processor distributes flow of data.

DETAILED DESCRIPTION

Embodiments of the present invention recognize that with the current state of network virtualization overlay, one of the challenges is to achieve load balancing control and resilience. Embodiments of the present invention recognize the need to place no hardware requirement on a layer 2 bridge network side, which allows a customer to use a low cost layer 2 switch for the layer 2 bridge network devices. Embodiments of the present invention also recognize the need for better load balancing between layer 2 gateways. Embodiments of the present invention detail an approach that can be used to achieve resilience and load balancing control over layer 2 gateways in a cluster.

Embodiments of the present invention will now be described in detail with reference to the Figures.

Figure 1:
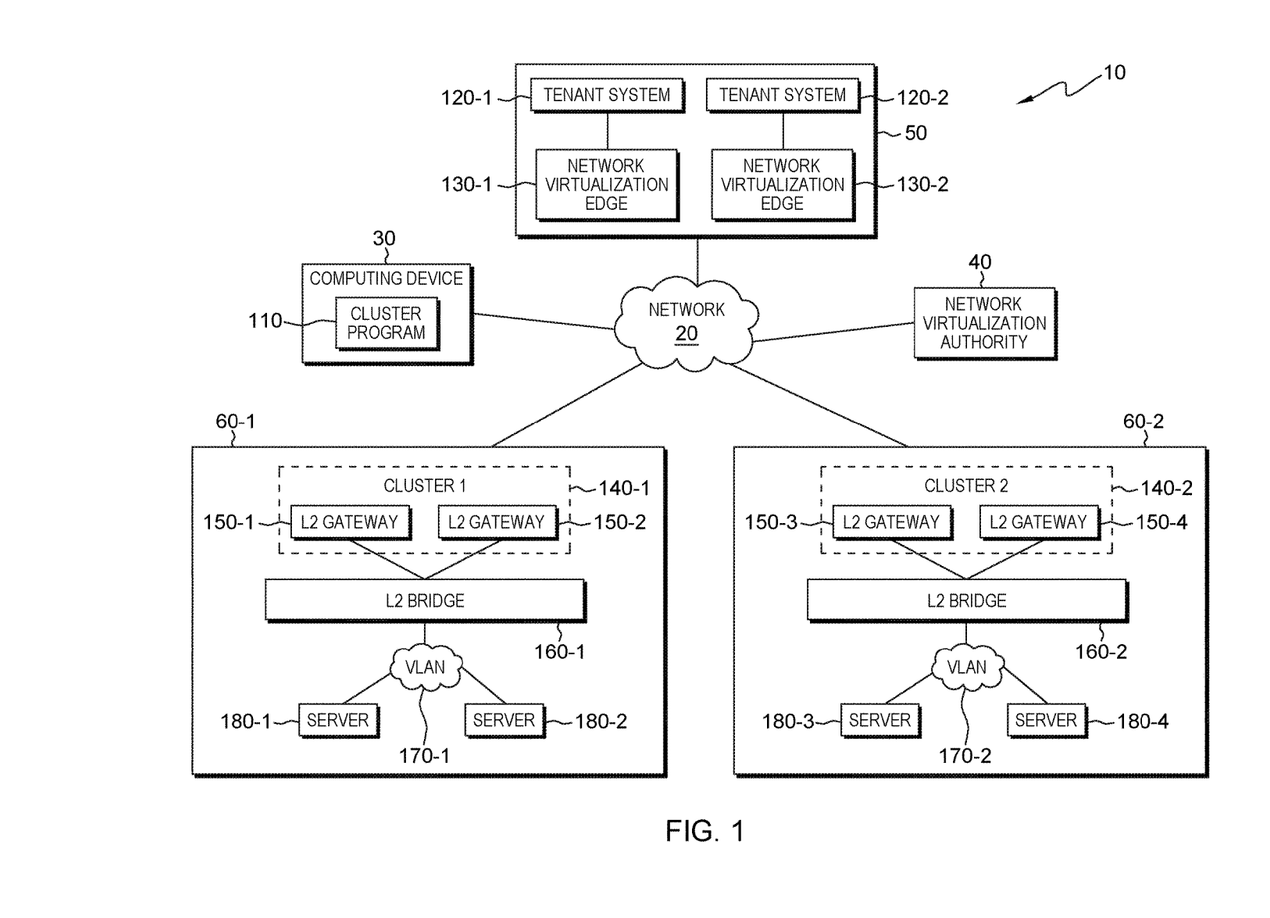
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, for simplicity purposes, tenant system 120-1 and 120-2; NVE 130-1 and 130-2; cluster 140-1 and 140-2; L2 Gateway 150-1, 150-2, 150-3, and 150-4; L2 bridge 160-1 and 160-2; VLAN 170-1 and 170-2; and server 180-1, 180-2, 180-3, and 180-4 represents that there can be one or more of each component.

In the depicted embodiment, computing system 10 includes computing device 30, network virtualization authority (NVA) 40, overlay network 50, and bridge network 60 interconnected over network 20. Network 20 may be an underlay network, a local area network (LAN), a wide area network (WAN) such as the Internet, a cellular data network, any combination thereof, or any combination of connections and protocols that will support communications between computing device 30, network virtualization authority 40, overlay network 50, and bridge network 60, in accordance with embodiments of the invention. Network 20 may include wired, wireless, or fiber optic connections. Computing system 10 may include additional computing devices, servers, or other devices not shown.

Computing device 30 may be a management server, a web server, or any other electronic device or computing system capable of processing program instructions and receiving and sending data. In some embodiments, computing device 30 may be a laptop computer, tablet computer, netbook computer, personal computer (PC), a desktop computer, or any programmable electronic device capable of communicating with NVA 40, overlay network 50, and bridge network 60 via network 20. In other embodiments, computing device 30 may represent a server computing system utilizing multiple computers as a server system, such as in a cloud computing environment. In another embodiment, computing device 30 represents a computing system utilizing clustered computers and components to act as a single pool of seamless resources. In the depicted embodiment, computing device 30 contains cluster program 110. In other embodiments, computing device 30 may include other components, as depicted and described in further detail with respect to FIG. 5.

NVA 40 provides reachability and forwarding information to the NVEs 130. Network virtualization is the process of combining hardware and software network resources and network functionality into a single, software-based administrative entity, a virtual network.

Overlay network 50 includes tenant system 120 and network virtualization edge (NVE) 130. In other embodiments, overlay network 50 may include other components.

Bridge network 60 includes cluster 140 (which includes layer 2 gateway (L2 Gateway) 150), layer 2 bridge (L2 bridge) 160, virtual local area network (VLAN) 170, and server 180. In other embodiments, bridge network 60 may include other components.

Cluster program 110 achieves resilience and load balancing control over layer 2 gateways 150 in a cluster 140. In doing so, cluster program 110 forms a cluster 140. Cluster program 110 registers endpoints. Cluster program 110 distributes flow. In the depicted embodiment, cluster program 110 resides on computing device 30. In other embodiments, cluster program 110 resides on NVA 40. In some embodiments, cluster program 110 resides on L2 Gateway 150. In other embodiments, cluster program 110 may reside on another computing device or another server, provided that cluster program 110 can access NVA 40, overlay network 50, and bridge network 60.

Tenant system 120 may be a management server, a web server, or any other electronic device or computing system capable of processing program instructions and receiving and sending data. In some embodiments, tenant system 120 may be a laptop computer, tablet computer, netbook computer, personal computer (PC), a desktop computer, or any programmable electronic device capable of communicating with server 180. In other embodiments, tenant system 120 may represent a server computing system utilizing multiple computers as a server system, such as in a cloud computing environment. In another embodiment, tenant system 120 represents a computing system utilizing clustered computers and components to act as a single pool of seamless resources. In the depicted embodiment, tenant system 120 resides on overlay network 50. In other embodiments, tenant system 120 may include other components, as depicted and described in further detail with respect to FIG. 5.

NVE 130 is the network entity that sits at the edge of an underlay network and implements L2 and/or L3 network virtualization functions. The network-facing side of NVE 130 uses the underlying L3 network to tunnel tenant frames to and from other NVEs. The tenant-facing side of NVE 130 sends and receives Ethernet frames to and from individual tenant systems, such as tenant system 120. NVE 130 can be implemented as part of a virtual switch within a hypervisor, a physical switch, or router. In the depicted embodiment, NVE 130 resides on overlay network 50. In other embodiments, NVE 130 may stand alone or reside on other components.

Cluster 140 includes one or more L2 Gateways 150. In the depicted embodiment, cluster 140 resides on bridge network 60. In other embodiments, cluster 140 may stand alone or reside on other components.

L2 Gateway 150 is used for the interconnection between bridge network 60 and overlay network 50. L2 Gateway 150 is essentially an NVE that can have the remote tenant systems 120 attach to a virtual network through a bridge network 60. L2 Gateway 150 includes NVE and IEEE802.1Q bridge functions and is used to interconnect a VLAN 170 with a specified overlay virtual network, effectively making the servers 180, or tenant systems 120, in the VLAN 170 and the tenant systems in the virtual network communicate with one another as they connect to the same LAN. In the depicted embodiment, L2 Gateway 150 resides within cluster 140 on bridge network 60. In other embodiments, L2 Gateway 150 may stand alone or reside on other components.

L2 bridge 160 bridges the L2 Gateways 150 to the VLANs 170. L2 bridge 160 resides on bridge network 60. In other embodiments, L2 bridge 160 may stand alone or reside on other components.

VLAN 170 is any broadcast domain that is partitioned and isolated in a computer network at the data link layer (OSI layer 2). VLAN 170 allows network administrators to group hosts together, even if the hosts are not on the same network switch. This can simplify network design and deployment, because VLAN 170 membership can be configured through software. Without VLANs 170, grouping hosts according to their resource needs necessitates the labor of relocating nodes or rewiring data links. In the depicted embodiment, VLAN 170 resides on bridge network 60. In other embodiments, VLAN 170 may stand alone or reside on other components.

Server 180 may be a management server, a web server, or any other electronic device or computing system capable of processing program instructions and receiving and sending data. In some embodiments, server 180 may be a laptop computer, tablet computer, netbook computer, personal computer (PC), a desktop computer, or any programmable electronic device capable of communicating with tenant system 120. In other embodiments, server 180 may represent a server computing system utilizing multiple computers as a server system, such as in a cloud computing environment. In another embodiment, server 180 represents a computing system utilizing clustered computers and components to act as a single pool of seamless resources. In the depicted embodiment, server 180 resides on bridge network 60. In other embodiments, server 180 may include other components, as depicted and described in further detail with respect to FIG. 5.

In some embodiments, tenant system 120 and server 180 may be used interchangeably, meaning the type of hardware may be the same. Additionally, in some embodiments, flow may be replaced with flow of data.

Figure 2:
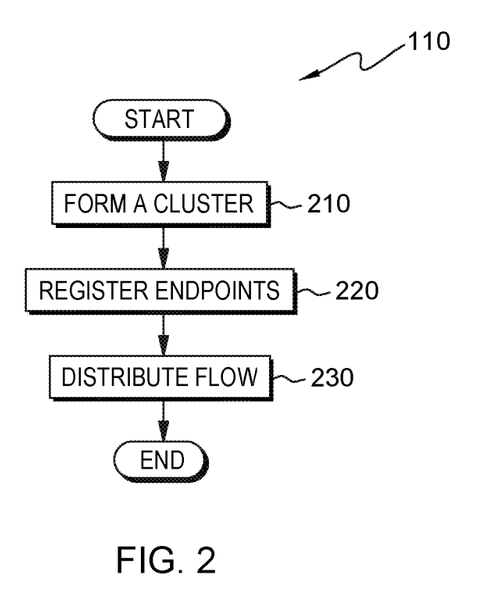
FIG. 2 depicts a flowchart of the steps of a cluster program, executing within the computing system of FIG. 1, for achieving resilience and load balancing control over layer 2 gateways in a cluster, in accordance with an embodiment of the present invention.

FIG. 2 depicts a flowchart of the steps of a cluster program, executing within the computing system of FIG. 1, in accordance with an embodiment of the present invention. Cluster program 110 achieves resilience and load balancing control over layer 2 gateways in a cluster.

In step 210, cluster program 110 forms a cluster 140. A cluster 140 includes a member table and a client table. In one embodiment, cluster program 110, running in L2 Gateway 150, registers to NVA 40 to form a cluster 140. In some embodiments, cluster program 110 forms one cluster 140. In other embodiments, cluster program 110 forms more than one cluster 140.

In accordance with an embodiment of the present invention, each L2 Gateway 150 that connects to the same bridge is assigned the same cluster ID. L2 Gateway 150 manipulates the cluster member table by sending a cluster join message to NVA 40 when L2 Gateway 150 is ready to serve. L2 Gateway 150 manipulates the cluster member table by sending a cluster leave message to NVA 40 when L2 Gateway 150 is not ready to serve (e.g., when the link connecting to the bridge network 60 is down). In one embodiment, the cluster join message includes the cluster ID and the virtual extensible local area network tunnel endpoint (VTEP) IP address of the L2 Gateway 150, which is used as the ID of the L2 Gateway 150. For each L2 Gateway cluster 140, the NVA 40 maintains an L2 Gateway cluster 140 member table. Upon receiving a cluster join message, an entry is created in the cluster 140 member table, wherein the entry contains the VTEP IP address of the L2 Gateway 150. Upon receiving a cluster leave message, the corresponding entry is removed. Any kind of keep-alive mechanism can be used between the L2 Gateways 150 and the NVA 40. The NVA 40 uses the keep-alive mechanism to detect whether the L2 Gateways 150 in the cluster 140 member tables are still working. When the NVA 40 detects an L2 Gateway 150 is not responsive, the NVA 40 removes the entry for that L2 Gateway 150 in the cluster 140 member table.

For each L2 Gateway cluster 140, the NVA 40 also maintains an L2 Gateway cluster 140 client table, which maps a client media access control (MAC) address to a VTEP IP address of an L2 Gateway 150, wherein the cluster client table binds the flow originating from a client to an L2 Gateway 150. The client is identified by a source MAC address. The client herein refers to a tenant system 120 attached to the virtual network at an entry NVE 130, which needs to access a server 180 in a bridge network 60 attaching to the virtual network through the L2 Gateway cluster 140. If the traffic originating from the same client MAC address goes through different L2 Gateways 150 of the cluster 140, then the traffic will cause a MAC address table flapping issue on the switches of the bridge network 60. The client table of an L2 Gateway cluster 140 records the L2 Gateway 150 selected for a specific client MAC address. The NVA 40 interacts with the NVEs 130 to ensure traffic originating from a client MAC address only traverses the selected L2 Gateway 150.

In step 220, cluster program 110 registers endpoints. An endpoint is a type of communication network node. In one embodiment, cluster program 110, running in L2 Gateway 150, registers the endpoints. In some embodiments, cluster program 110 registers one endpoint. In other embodiments, cluster program 110 registers more than one endpoint.

In accordance with an embodiment of the present invention, a MAC address can be associated to a VTEP IP address or an L2 Gateway cluster ID, wherein the MAC address is associated to the L2 Gateway cluster ID if it is registered by an L2 Gateway 150 that is a member of the L2 Gateway cluster 140. A flag can be used to indicate whether the MAC address is associated with a VTEP IP address or an L2 Gateway cluster ID. The following illustrates one embodiment to construct the endpoint database:

| Destination MAC Address | Flag | VTEP or Cluster ID |
|---|---|---|
| 00:00:00:00:00:01 | 0 | VTEP1 |
| 00:00:00:00:00:02 | 1 | L2 Gateway Cluster 1 |
| 00:00:00:00:00:03 | 0 | VTEP2 |
| ... | ... | ... |

In accordance with an embodiment of the present invention, when the NVE function of an L2 Gateway 150 registers an endpoint for the tenant system 120 attached to the virtual network through a bridge network 60, the endpoint registry information contains the cluster ID, as well as information contained in conventional implementation, wherein the L2 Gateway 150 is a member of an L2 Gateway cluster 140.

In step 230, cluster program 110 distributes flow. In one embodiment, cluster program 110, running in NVA 40, distributes flow. In some embodiments, cluster program 110 distributes forward flow. In other embodiments, cluster program 110 distributes backward flow. In some embodiments, cluster program 110 distributes forward and backward flow.

The flow herein refers to, both, forward flow and backward flow. A forward flow originates from a tenant system 120 connected to an entry NVE 130 and targeting to a server 180 located at a bridge network 60, wherein the bridge network 60 is connected by a cluster 140 of L2 Gateways 150. A backward flow originates from a server 180 located at a bridge network 60 and targeting to a tenant system 120 connected to an entry NVE 130, wherein the bridge network 60 is connected by a cluster 140 of L2 Gateways 150. Any of the L2 Gateways 150 are capable to carry the flows across the overlay network 50 and bridge network 60.

The forward flow distribution is determined by the NVA 40 and enforced by the entry NVE 130. For each virtual network, the NVE 130 contains a forwarding table. Each entry of the table associates a MAC address to a VTEP IP address. The NVE 130 interacts with the NVA 40 to get the necessary information to populate a forwarding entry.

In accordance with an embodiment of the present invention, when an entry NVE 130 receives a frame from a local attached tenant system 120 targeting to a server 180 in a bridge network 60, the entry NVE 130 uses the destination MAC address in the frame to lookup the NVE's 130 forwarding table. At the beginning, the entry for the destination MAC address is not populated, so the NVE 130 sends a query message to the NVA 40 to resolve the endpoint information of the MAC address. The query message includes the virtual network identification (VNID), the destination MAC address, and the source MAC address of the frame.

After receiving the query form the NVE 130, the NVA 40 looks up the destination MAC address in the NVA's 40 endpoint database and then determines the matched entry is associated with an L2 Gateway cluster ID. The NVA 40 looks up the source MAC address in the client table pertaining to the cluster 140. If an entry is matched, it uses the VTEP IP address of the entry as the selected VTEP IP address; otherwise, it uses one of the VTEP IP addresses in the L2 Gateway cluster 140 member table, according to a particular algorithm as the selected VTEP IP address. In one embodiment, the NVA 40 monitors the workload of the L2 Gateways 150, wherein the said algorithm selects the L2 Gateway 150 with the lesser workload.

The response message from the NVA 40 includes the VNID, the destination MAC address, the cluster ID associated to the destination MAC address, the source MAC address, and the VTEP IP address selected. After the NVE 130 receives the response message, the NVE 130 installs a forwarding entry for the destination MAC address. The entry's destination is the L2 Gateway cluster ID and has extra information to indicate if the destination is the L2 Gateway cluster 140. This special entry is referred to as an L-entry (L2 Gateway cluster directing entry). The following illustrates the forwarding table and its entries:

| Destination MAC Address | VNID | IS-L-Entry | VTEP or Cluster ID |
|---|---|---|---|
| 00:00:00:00:00:01 | 1000 | 0 | VTEP1 IP Address |
| 00:00:00:00:00:02 | 1002 | 1 | L2 Gateway Cluster 1 |
| 00:00:00:00:00:03 | 1003 | 1 | L2 Gateway Cluster 2 |
| ... | ... | ... | ... |

For L-entry, the cluster ID associates the entry with a L2 Gateway cluster 140 client table. The L2 Gateway cluster 140 client table on the NVE 130 is an instantiation of the L2 Gateway cluster 140 client table on the NVA 40. The client table is used to distribute the forward flows evenly and ensure forward flows pertaining to the same MAC address only go through the same L2 Gateway 150. The NVE 130 uses the information contained in the response message to populate, both, the forwarding entry and L2 Gateway cluster 140 client table entry. The following illustrates an example of a client table per cluster ID:

| Cluster ID | Source MAC Address | VTEP |
|---|---|---|
| 1 | 00:00:00:00:00:0A | L2 Gateway VTEP1 IP Address |
| 2 | 00:00:00:00:00:0B | L2 Gateway VTEP2 IP Address |

| Cluster ID | Source MAC Address | VTEP |
|---|---|---|
| 3 | 00:00:00:00:00:0C | L2 Gateway VTEP3 IP Address |
| ... | ... | ... |

When the NVE 130 uses the destination MAC address of a frame to look up the forwarding table, and if the matched entry is an L-entry, the NVE 130 further looks up the source MAC address of the frame in the client table indicated by the cluster ID associated with the forwarding entry. If either of the lookups fail, the NVE 130 sends a query to the NVA 40 to resolve the endpoint information for the destination MAC address of the frame. The success of the second lookup determines the destination VTEP to forward the frame.

When the forward flows pertaining to specific tenant systems 120 go through different L2 Gateways 150 of a cluster 140, it causes a MAC address table flapping issue on the switches of the bridge network 60. The said methods with the cluster 140 client table can ensure the unicast forward flows pertaining to the same tenant system 120 always to through the same L2 Gateway 150. For broadcast forward flow, the selection of the VTEP IP address is determined by a VTEP list for that virtual network. There may be a case where the unicast forward flows and broadcast flows pertaining to the same tenant system 120 might go through different L2 Gateways 150. In accordance with the present invention, the following can be used to resolve the issue.

When the NVE 130 replicates the broadcast frame for a VTEP node in the virtual network broadcast VTEP list and if the node has additional attributes that indicate the node is a member of an L2 Gateway cluster 140, then the NVE 130 uses the source MAC address to lookup the client table of the cluster 140. If there is a matched entry, the replication broadcast frame for the VTEP node will be directed to the VTEP IP address of the matched entry. Otherwise, the VTEP IP address of the node is used to direct the replication broadcast frame.

Figure 3A:
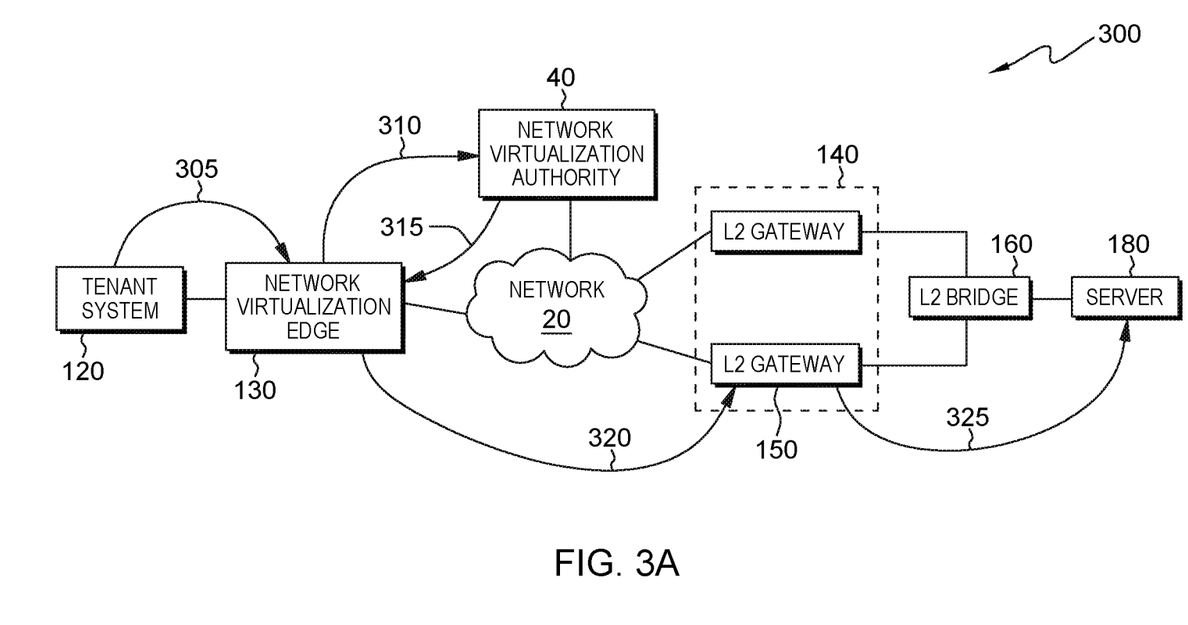
FIG. 3A depicts an example of the steps of an end-to-end interaction for forward flow process.

FIG. 3A depicts environment 300, which is an example of the steps of an end-to-end interaction for forward flow process.

In step 305, the tenant system 120 sends a frame to the NVE 130, targeting the server 180.

In step 310, the NVE 130 receives a frame and looks up the local forwarding table using the destination MAC address in the frame. If an entry is found (the entry should be an L-entry and the source MAC address of the frame should match the source MAC address of the client table), then step 320 is executed. If an entry is not found, then the NVE 130 sends a query which contains the VNID, the destination MAC address, and the source MAC address of the frame to the NVA 40 to get the server 180 forwarding information.

In step 315, after receiving the query from the NVE 130, the NVA 40 selects an L2 Gateway 150 and sends the response to the NVE 130. After receiving the response message from the NVA 40, the NVE 130 adds an L-entry in the local forwarding table and the L2 Gateway 150 client table.

In step 320, with the L-entry in the local forwarding table, the NVE 130 encapsulates the frame originated from the tenant system 120 and sends the encapsulated frame to the L2 Gateway 150.

In step 325, the L2 Gateway 150 receives the encapsulated frame from the NVE 130 and strips off an overlay header. The L2 Gateway 150 adds a VLAN 170 header in the frame and sends the frame to the server 180 through the bridge network 60.

Figure 3B:
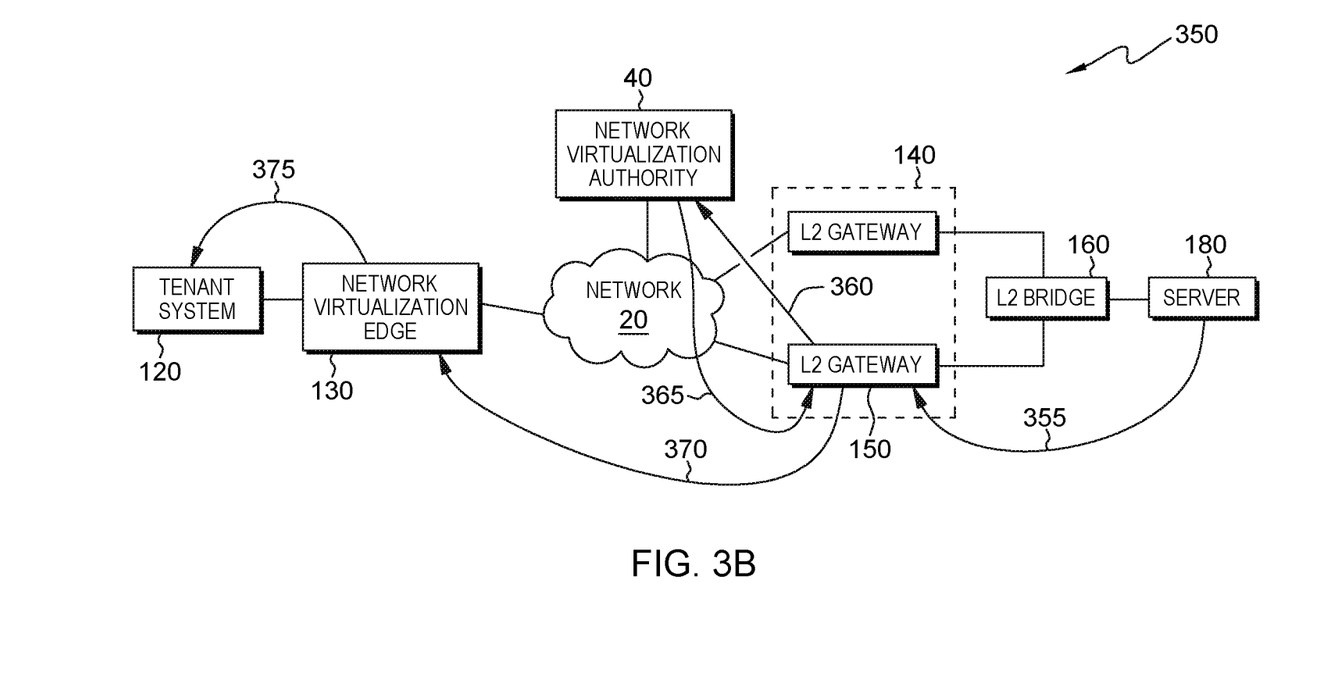
FIG. 3B depicts an example of the steps of an end-to-end interaction for backward flow process.

FIG. 3B depicts environment 350, which is an example of the steps of an end-to-end interaction for backward flow process.

In step 355, the switch in the bridge network 60 has learned the MAC address of the tenant system 120 on corresponding ports when the tenant system 120 sends traffic to the server 180. Therefore, when the server 180 sends traffic to the tenant system 120, the traffic is directed to a specific L2 Gateway 150.

In step 360, the L2 Gateway 150 receives a frame and looks up the local forwarding table using the destination MAC address in the frame. If an entry is found, then step 370 is executed. If the entry is not found, then the L2 Gateway 150 sends a query that includes the VNID, the destination MAC address, and the source MAC address of the frame to the NVA 40 to get the forwarding information of the tenant system 120.

In step 365, after receiving the query from the NVE 130, the NVA 40 sends a response to the L2 Gateway 150. After receiving the response message from the NVA 40, the L2 Gateway 150 adds an entry in the local forwarding table.

In step 370, with the entry in the forwarding table, the L2 Gateway 150 encapsulates the frame that is received from the server 180 and sends the encapsulated frame to the NVE 130.

In step 375, the NVE 130 receives the encapsulated frame from the L2 Gateway 150 and strips off an overlay header. The NVE 130 sends the frame to the tenant system 120.

Figure 4:
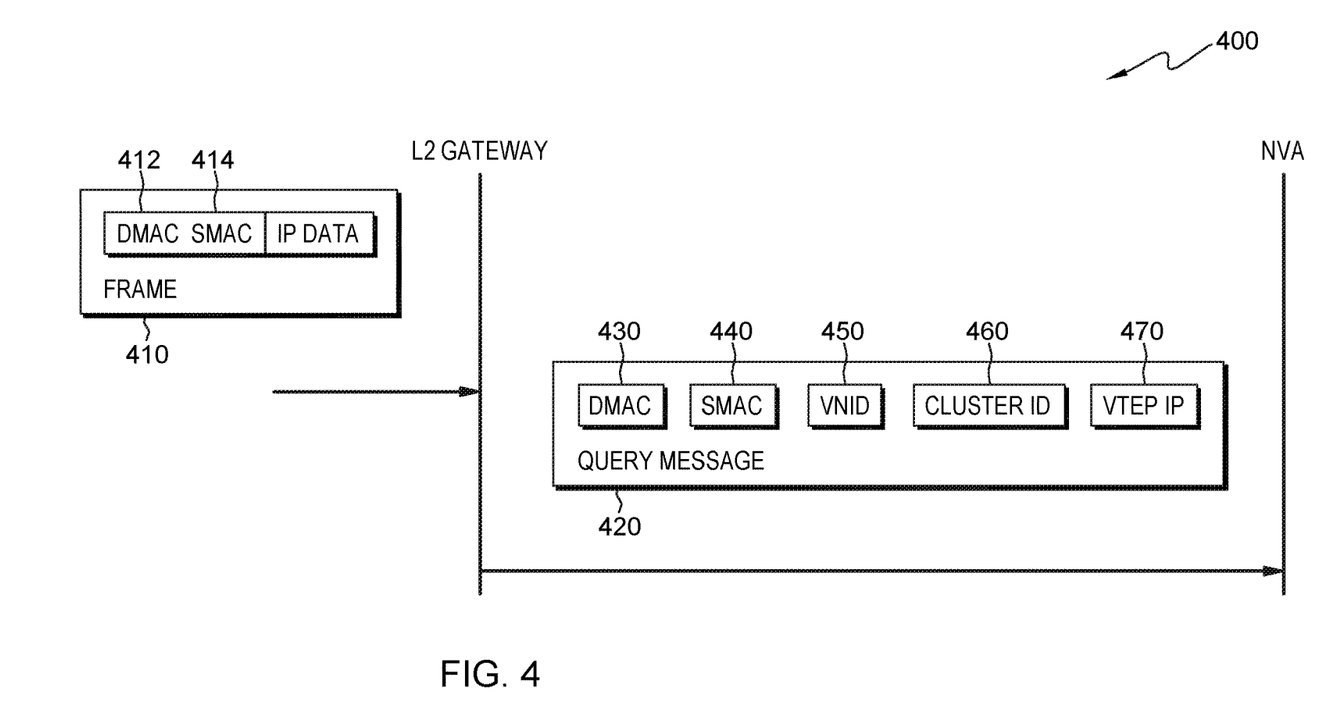
FIG. 4 depicts an example of a query message sent by an L2 Gateway.

FIG. 4 depicts environment 400, which is an example of a query message sent by an L2 Gateway.

In accordance with the present invention, when the NVA 40 generates the VTEP list for a given virtual network and if an L2 Gateway cluster 140 contains that virtual network, then the NVA 40 chooses only one of the L2 Gateways 150 in the cluster 140 and adds into the list that indicates the VTEP is a member of an L2 Gateway cluster 140, along with the L2 Gateway cluster ID. When an entry NVE 130 of an L2 Gateway 150 uses a broadcast list to realize the broadcast and if a target VTEP is a member of an L2 Gateway cluster 140 and the cluster ID is the same, then the NVE 130 skips the replication for the VTEP.

After an L2 Gateway 150 of a cluster 140 strips off the overlay header of the forward flow, the traffic is then directed to a tenant system 120 through the bridge network 60. The bridge network 60 floods the traffic to other L2 Gateways 150 when the traffic is broadcast of destination lookup fail (DLF) traffic. The forward flow reflected by the bridge network 60 is detected and dropped at the L2 Gateway 150. In one embodiment, an L2 Gateway 150 of a cluster 140 examines the source MAC address of ingress frame; and if the source MAC address already registered on the controller and associated with other VTEPs, then the frame is dropped.

The bridge network 60 also floods backward flow to all L2 Gateways 150 connecting to the bridge network 60 when the traffic is broadcast or DLF traffic. Only one of the L2 Gateways 150 in the cluster 140 processes the traffic. In accordance with the present invention, one of the L2 Gateways 150 in the cluster 140 is appointed as the primary gateway by the NVA 40, and only the primary L2 Gateway 150 processes the broadcast backward flow. For backward flow with a non-broadcast destination MAC address, the NVEs 130 of the L2 Gateways 150 interact with the NVA 40 to assure only one NVE 130 populates the forwarding entry for a specific non-broadcast destination MAC address. The NVA 40 drops the backward flow with an unknown unicast destination MAC address.

FIG. 4 illustrates one embodiment. An L2 Gateway 150 receives a frame 410 from the bridge network 60 side. The NVE module of the L2 Gateway 150 uses the destination MAC address (DMAC) 412 to look up a local forwarding table. Initially, the local forwarding table does not contain the entry for DMAC 412, so it sends query message 420 to NVA 40 to resolve the endpoint information of DMAC address 412. The query message 420 contains destination media access control (DMAC) address 430, source media access control (SMAC) address 440, VNID 450, cluster ID 460, and its own VTEP IP address 470, wherein the DMAC address 430 is identical to the DMAC address 412 of frame 410 and the SMAC address 440 is identical to the SMAC address 414 of frame 410.

After receiving the query message 420, NVA 40 looks up the DMAC address 430 in an endpoint database and determines a matched entry pertaining to the DMAC address. From the information in the query message 420, NVA 40 determines the query message 420 is from an L2 Gateway 150 identified by cluster ID 460 and VTEP IP address 470 for a backward flow from the SMAC address 440 to the DMAC address 430. The NVA 40 further examines whether corresponding forward flow—from DMAC address 430 to SMAC address 440—selects the VTEP IP address 470 as the associated VTEP IP address by looking up the client table pertaining to cluster ID 460 using the DMAC address 430. If there is no matched entry, NVA 40 installs a new entry in the client table for DMAC address 430 and select a VTEP IP address according to the aforementioned algorithm. If the matched entry or new created entry contains a different VTEP IP address than VTEP IP address 470, NVA 40 will not respond to query message 420. If the matched entry contains the identical VTEP IP address as VTEP IP address 470, the NVA 40 responds to the query message 420 accordingly.

Figure 5:
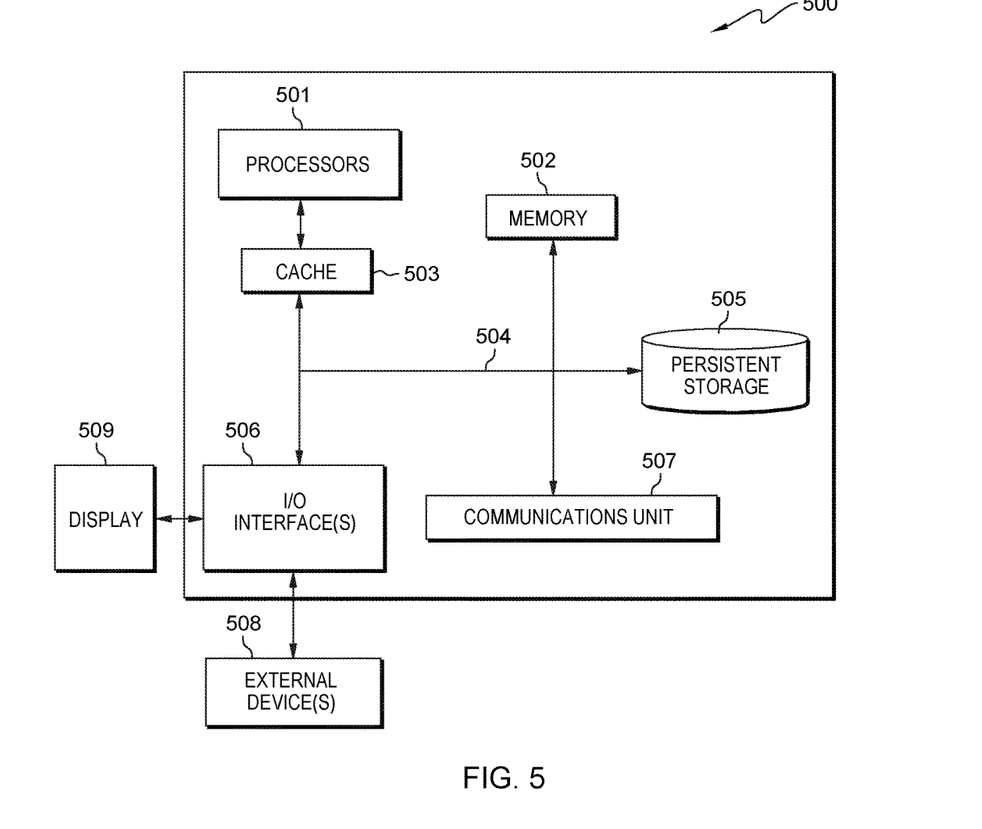
FIG. 5 depicts a block diagram of components of the server and/or the computing device of FIG. 1, in accordance with an embodiment of the present invention.

FIG. 5 depicts computer system 500, which is an example of a system, such as computing device 30, network virtualization authority (NVA) 40, overlay network 50, and/or bridge network 60. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507. Cluster program 110 may be downloaded to persistent storage 505 of computing device 30 through communications unit 507 of computing device 30.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., cluster program 110, can be stored on such portable computer readable storage media and can be loaded onto persistent storage 505 of computing device 30 via I/O interface(s) 506 of computing device 30. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for achieving resilience and load balancing control over layer 2 gateways in a cluster, the method comprising the steps of:

forming, by one or more processors, a cluster, wherein the cluster includes one or more layer 2 gateways;

registering, by one or more processors, endpoints for a tenant system attached to a virtual network through a bridge network to add to an endpoint database used to associate a destination media access control (MAC) address with the cluster;

maintaining, by one or more processors, a cluster member table and a cluster client table, wherein the cluster member table includes an entry of the one or more layer 2 gateways in the cluster and a Virtual Extensible Lan Tunnel Endpoint (VTEP) Internet Protocol (IP) address associated with each of the one or more layer 2 gateways, and wherein the cluster client table maps a client MAC address to the VTEP IP address associated with each of the one or more layer 2 gateways; and transferring, by one or more processors, flow of data to achieve resilience and load balancing control over the one or more layer 2 gateways in the cluster.

2. The method of claim 1, wherein maintaining the cluster member table and the cluster client table comprises:

manipulating, by one or more processors, the cluster member table using a cluster join message and a cluster leave message, wherein the cluster join message is an indication of being ready to operate, and wherein the cluster leave message is an indication of not being ready operate.

3. The method of claim 2, wherein the cluster client table binds the flow originating from a client to a layer 2 gateway of the one or more layer 2 gateways, and wherein the client is identified by a source MAC address.

4. The method of claim 3, wherein a forwarding table is used to associate the destination MAC address with the cluster and to use the source MAC address to lookup the cluster client table for a VTEP IP address associated with the destination MAC address.

5. The method of claim 1, wherein the registered endpoints include a cluster ID.

6. The method of claim 1, wherein the flow of data includes a forward flow of data and a backward flow of data.

7. A computer program product for achieving resilience and load balancing control over layer 2 gateways in a cluster, the computer program product comprising:

one or more computer readable storage media and program instructions stored on the one or more computer readable storage media, wherein the one or more computer readable storage media is not a transitory signal per se, the program instructions comprising:

program instructions to form a cluster, wherein the cluster includes one or more layer 2 gateways;

program instructions to register endpoints for a tenant system attached to a virtual network through a bridge network to add to an endpoint database used to associate a destination media access control (MAC) address with the cluster;

program instructions, stored on the one or more computer readable storage media, to maintain a cluster member table and a cluster client table, wherein the cluster member table includes an entry of the one or more layer 2 gateways in the cluster and a Virtual Extensible Lan Tunnel Endpoint (VTEP) Internet Protocol (IP) address associated with each of the one or more layer 2 gateways, and wherein the cluster client table maps a client MAC address to the VTEP IP address associated with each of the one or more layer 2 gateways; and program instructions to transfer flow of data to achieve resilience and load balancing control over the one or more layer 2 gateways in the cluster.

8. The computer program product of claim 7, wherein program instructions to maintain the cluster member table and the cluster client table comprise:

program instructions to manipulate the cluster member table using a cluster join message and a cluster leave message, wherein the cluster join message is an indication of being ready to operate, and wherein the cluster leave message is an indication of not being ready operate.

9. The computer program product of claim 7, wherein the cluster client table binds the flow originating from a client to a layer 2 gateway of the one or more layer 2 gateways, and wherein the client is identified by a source MAC address.

10. The computer program product of claim 9, wherein a forwarding table is used to associate the destination MAC address with the cluster and to use the source MAC address to lookup the cluster client table for a VTEP IP address associated with the destination MAC address.

11. The computer program product of claim 7, wherein the registered endpoints include a cluster ID.

12. The computer program product of claim 7, wherein the flow of data includes a forward flow of data and a backward flow of data.

13. A computer system for achieving resilience and load balancing control over layer 2 gateways in a cluster, the computer system comprising:

one or more computer processors, one or more computer readable storage media, wherein the one or more computer readable storage media is not a transitory signal per se, and program instructions stored on the one or more computer readable storage media for execution by at least one of the one or more computer processors, the program instructions comprising:

program instructions to form a cluster, wherein the cluster includes one or more layer 2 gateways;

program instructions to register endpoints for a tenant system attached to a virtual network through a bridge network to add to an endpoint database used to associate a destination media access control (MAC) address with the cluster;

program instructions, stored on the computer readable storage media for execution by at least one of the one or more processors, to maintain a cluster member table and a cluster client table, wherein the cluster member table includes an entry of the one or more layer 2 gateways in the cluster and a Virtual Extensible Lan Tunnel Endpoint (VTEP) Internet Protocol (IP) address associated with each of the one or more layer 2 gateways, and wherein the cluster client table maps a client MAC address to the VTEP IP address associated with each of the one or more layer 2 gateways; and program instructions to transfer flow of data to achieve resilience and load balancing control over the one or more layer 2 gateways in the cluster.

14. The computer system of claim 13, wherein program instructions to maintain the cluster member table and the cluster client table comprise:

program instructions to manipulate the cluster member table using a cluster join message and a cluster leave message, wherein the cluster join message is an indication of being ready to operate, and wherein the cluster leave message is an indication of not being ready operate.

15. The computer system of claim 13, wherein the cluster client table binds the flow originating from a client to a layer 2 gateway of the one or more layer 2 gateways, and wherein the client is identified by a source MAC address.

16. The computer system of claim 15, wherein a forwarding table is used to associate the destination MAC address with the cluster and to use the source MAC address to lookup the cluster client table for a VTEP IP address associated with the destination MAC address.

17. The computer system of claim 13, wherein the registered endpoints include a cluster ID.

* * * * *